United States Patent
Enslin et al.

(10) Patent No.: US 11,084,394 B2
(45) Date of Patent: Aug. 10, 2021

(54) ELECTRIFIED VEHICLE STATE OF CHARGE COMMUNICATION METHOD AND ASSEMBLY

(71) Applicant: Ford Global Technologies, LLC, Dearborn, MI (US)

(72) Inventors: Heinrich Enslin, Dearborn, MI (US); Jeffery R. Grimes, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 380 days.

(21) Appl. No.: 16/285,780

(22) Filed: Feb. 26, 2019

(65) Prior Publication Data

US 2020/0269720 A1 Aug. 27, 2020

(51) Int. Cl.
*B60L 58/12* (2019.01)
*G07C 5/08* (2006.01)
*B60K 6/20* (2007.10)
*H04L 29/08* (2006.01)

(52) U.S. Cl.
CPC ............ *B60L 58/12* (2019.02); *G07C 5/0816* (2013.01); *B60K 6/20* (2013.01); *B60L 2240/54* (2013.01); *B60L 2240/70* (2013.01); *B60Y 2200/91* (2013.01); *B60Y 2200/92* (2013.01); *H04L 67/10* (2013.01)

(58) Field of Classification Search
CPC .. B60L 2240/54; B60L 2240/70; B60L 53/66; B60L 53/67; B60L 53/68; B60L 58/12; B60K 6/20; B60Y 2200/91; B60Y 2200/92; G07C 5/008; G07C 5/0816; H04L 67/10; Y02T 10/70; Y02T 10/7072; Y02T 90/12; Y02T 90/16; Y02T 90/167; Y04S 30/12

See application file for complete search history.

(56) References Cited

U.S. PATENT DOCUMENTS

| | | | | |
|---|---|---|---|---|
| 6,090,007 | A * | 7/2000 | Nakajima | B60W 20/00 477/46 |
| 7,605,561 | B2 * | 10/2009 | Yamazaki | B60K 6/48 320/104 |
| 9,079,507 | B2 | 7/2015 | Smith et al. | |
| 9,469,289 | B2 | 10/2016 | Yu | |
| 9,580,079 | B2 | 2/2017 | Long | |
| 2002/0107618 | A1 * | 8/2002 | Deguchi | B60W 50/0097 701/22 |
| 2006/0061322 | A1 * | 3/2006 | Yamazaki | B60K 6/48 320/104 |
| 2011/0047052 | A1 | 2/2011 | Cornish | |
| 2013/0187611 | A1 * | 7/2013 | Suzuki | H02J 7/0014 320/118 |

(Continued)

*Primary Examiner* — Tyler J Lee
(74) *Attorney, Agent, or Firm* — David Kelley, Esq.; Carlson, Gaskey & Olds, P.C.

(57) ABSTRACT

An electrified vehicle state of charge communication method includes, among other things, communicating a charge state notification when an actual state of charge of a traction battery is depleted such that the actual state of charge falls within a first reserve range. The method further includes adjusting the first reserve range to provide a second reserve range different than the first reserve range, and, after the adjusting, communicating the charge state notification when the actual state of charge is depleted such that the actual state of charge falls within the second reserve range.

19 Claims, 3 Drawing Sheets

(56) References Cited

U.S. PATENT DOCUMENTS

| | | | |
|---|---|---|---|
| 2013/0221928 A1* | 8/2013 | Kelty | B60L 58/24 320/134 |
| 2015/0032318 A1 | 1/2015 | Gao | |
| 2015/0067362 A1* | 3/2015 | Sultenfuss | G06F 1/263 713/320 |
| 2015/0112526 A1* | 4/2015 | Martin | G01C 21/3469 701/22 |
| 2017/0282738 A1 | 10/2017 | Miller et al. | |
| 2017/0341517 A1* | 11/2017 | Morita | B60L 1/00 |
| 2017/0355358 A1* | 12/2017 | Ogawa | B60W 10/08 |

* cited by examiner

ELECTRIFIED VEHICLE STATE OF CHARGE COMMUNICATION METHOD AND ASSEMBLY

TECHNICAL FIELD

This disclosure relates generally to a charge state notification that is communicated to a user of an electrified vehicle. The charge state notification can indicate a state of charge for a traction battery of the electrified vehicle.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery can include battery arrays each including a plurality of interconnected battery cells that store energy. Some electrified vehicles can charge the traction battery from an external power source.

An actual state of charge (SOC) for the traction battery represents an amount of energy stored within the traction battery available for powering the electric machines and other electrical loads of the electrified vehicle. A user of the electrified vehicle may be presented with notifications related to the SOC. In some examples, the notifications can indicate, or display, a charge state from zero to one-hundred percent.

The notifications, however, may not correspond directly to an actual SOC of the traction battery. For example, the user may be presented with a charge state notification indicating that the SOC of the traction battery is zero, but the actual SOC of the traction battery still includes some reserve charge. The charge state notification indicating that the SOC of the traction battery is zero can prompt the user to recharge the traction battery. The reserve charge can provide some buffer to, among other things, help to prevent the user from becoming stranded.

SUMMARY

An electrified vehicle state of charge communication method according to an exemplary aspect of the present disclosure includes, among other things, communicating a charge state notification when an actual state of charge of a traction battery is depleted such that the actual state of charge falls within a first reserve range. The method further includes adjusting the first reserve range to provide a second reserve range different than the first reserve range, and, after the adjusting, communicating the charge state notification when the actual state of charge is depleted such that the actual state of charge falls within the second reserve range.

In another example of the foregoing method, the adjusting comprises increasing such that an upper limit of the second reserve range is greater than an upper limit of the first reserve range.

In another example of any of the foregoing methods, prior to the adjusting, the charge state notification indicates that that traction battery has a state of charge that is zero when the actual state of charge falls within the first reserve range. Further, after the adjusting, the charge state notification indicates that the traction battery has a state of charge that is zero when the actual state of charge falls within the second reserve range.

In another example of any of the foregoing methods, the actual state of charge of the traction battery is greater than zero when the charge state notification is communicated prior to the adjusting, and the actual state of charge of the traction battery is greater than zero when the charge state notification is communicated after the adjusting.

In another example of any of the foregoing methods, the charge state notification comprises displaying that that traction battery has a state of charge that is zero.

In another example of any of the foregoing methods, prior to the adjusting, the charge state notification indicates that the traction battery has a state of charge that is zero when the actual state of charge of the traction battery is depleted to a first amount that is greater than zero, Further, after the adjusting, the charge state notification indicates that the traction battery has a state of charge that is zero when the actual state of charge of the traction battery is depleted to a second amount that is greater than zero. The second amount is different than the first amount.

Another example of any of the foregoing methods includes adjusting in response to a communication received from outside the electrified vehicle.

Another example of any of the foregoing methods includes sending a request for the communication. The request is sent from the electrified vehicle.

In another example of any of the foregoing methods, prior to the adjusting, a regular operating range for the traction battery has a lower limit corresponding to an upper limit of the first reserve range. The actual state of charge of the traction battery is within the regular operating range when the actual state of charge of the traction battery has not been depleted to fall within the first reserve range.

In another example of any of the foregoing methods, the adjusting includes decreasing a lower limit of the regular operating range and an upper limit of the first reserve range.

In another example of any of the foregoing methods, the adjusting includes increasing a lower limit of the regular operating range and an upper limit of the first reserve range.

An electrified vehicle state of charge communication assembly according to another exemplary aspect of the present disclosure includes, among other things, a traction battery, a notification system that communicates a charge state notification to a user in response to an actual state of charge of the traction battery being depleted to fall within a reserve range, and a controller that adjusts the reserve range to change the actual state of charge that will cause the notification system to communicate the charge state notification.

In another example of the foregoing assembly, the controller adjusts the reserve range by increasing or decreasing the reserve range.

In another example of any of the foregoing assemblies, increasing the reserve range raises a lower limit of a regular operating range, and decreasing the reserve range lowers the lower limit of the regular operating range.

In another example of any of the foregoing assemblies, the controller adjusts the reserve range in response to an adjustment communication received from outside the electrified vehicle.

In another example of any of the foregoing assemblies, the adjustment communication is received from an at least partially cloud-based server.

Another example of any of the foregoing assemblies includes a transmitter of the electrified vehicle that sends a requesting communication from the electrified vehicle to the at least partially cloud-based server. The requesting communication from the electrified vehicle prompts the at least partially cloud-based server to transmit the adjustment communication to the electrified vehicle.

In another example of any of the foregoing assemblies, the charge state notification indicates that the traction battery has a state of charge that is zero.

In another example of any of the foregoing assemblies, the actual state of charge of the traction battery is greater than zero when the charge state notification indicates that the traction battery has a state of charge that is zero.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to adjusting an actual state of charge (SOC) for a traction battery of an electrified vehicle at which a charge state notification is provided to a user of the electrified vehicle.

A charge state notification can be communicated to a user when the actual SOC is depleted to fall within a reserve range. The charge state notification can indicate, for example, that the traction battery has a SOC that is zero. The adjusting can include adjustments to the reserve range. The adjusting can thus change the actual SOC at which the charge state notification indicating a SOC that is zero is communicated to the user.

Figure 1:
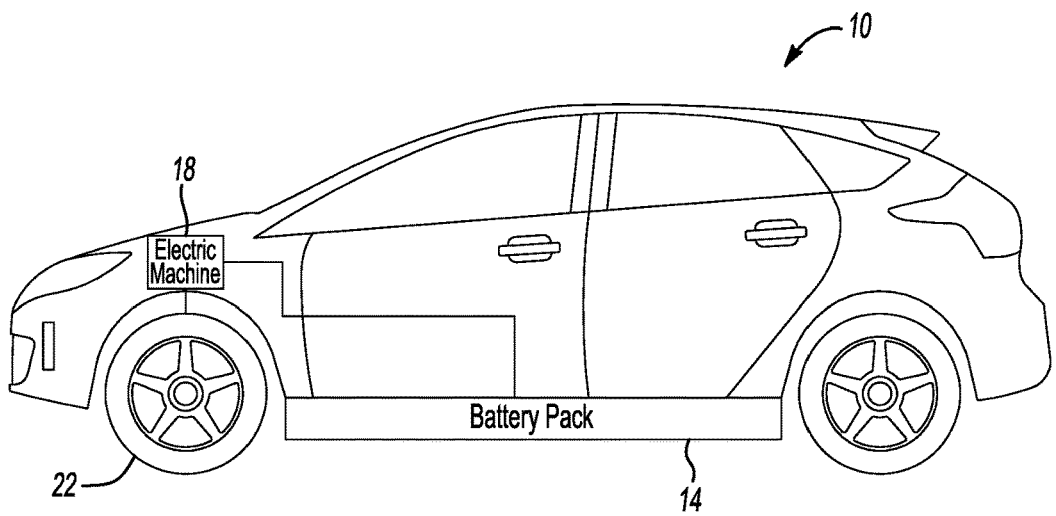
FIG. 1 illustrates a side view of an exemplary electrified vehicle.

Referring to FIG. 1, an example electrified vehicle 10 includes a traction battery 14 that powers an electric machine 18. When powered, the electric machine 18 generates torque to power drive wheels 22 of the electrified vehicle. The electrified vehicle 10 is a battery electric vehicle (BEV) in this example.

Although the electrified vehicle 10 is depicted as a BEV, it should be understood that the concepts described herein are not limited to BEVs and could extend to other types of electrified vehicle, including, but not limited to, plug-in hybrid electric vehicles (PHEVs), hybrid electric vehicles (HEVs), etc. The scope of this disclosure can include any vehicle having, for example, the traction battery 14.

Figure 2:
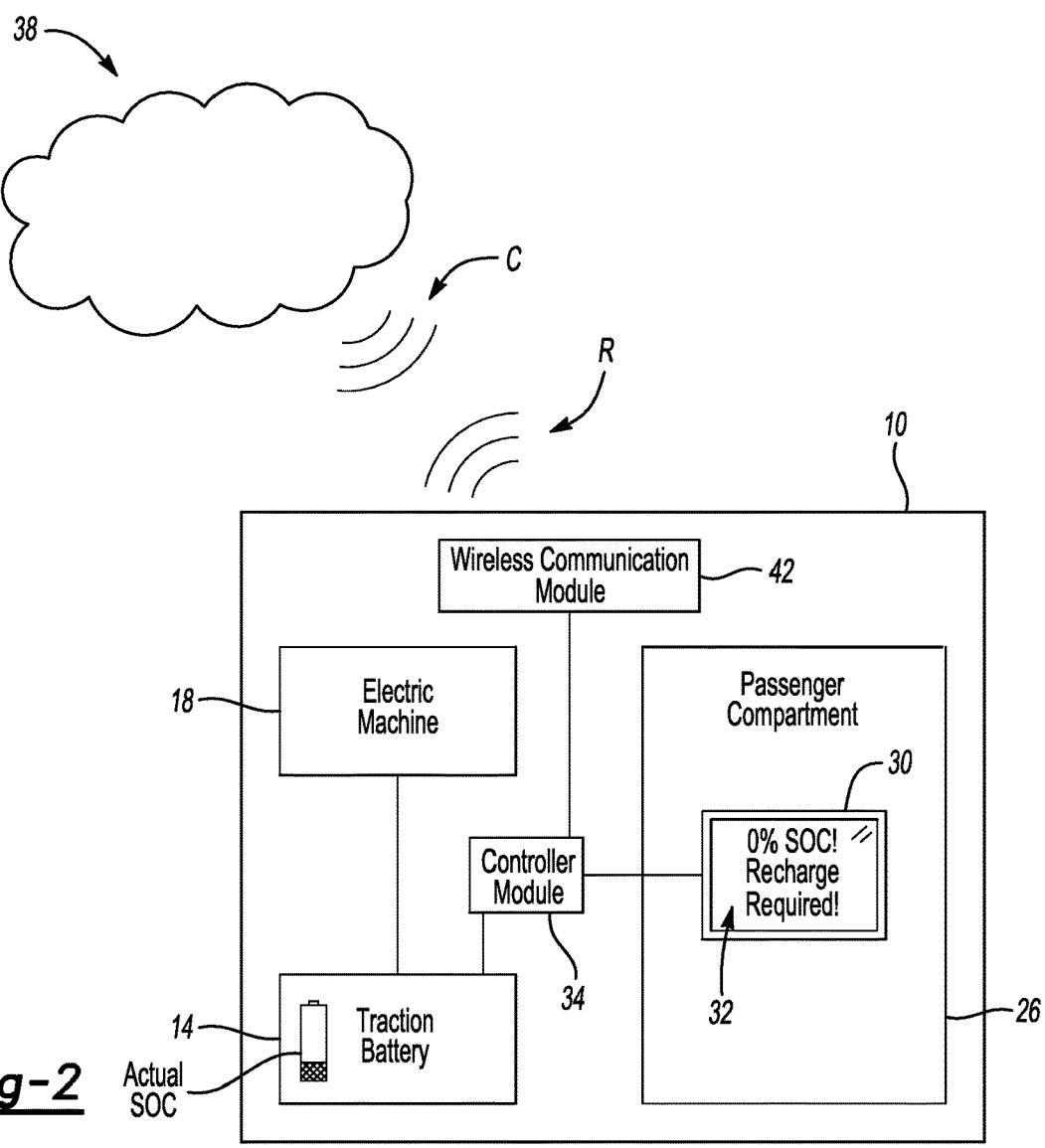
FIG. 2 illustrates a schematic view of the electrified vehicle of FIG. 1.

With reference now to FIG. 2 and continued reference to FIG. 1, the electrified vehicle 10 includes a passenger compartment 26. Within the passenger compartment 26 is a display 30. On the display 30, a charge state notification 32 can be communicated to a user of the electrified vehicle 10, such as a user within the passenger compartment 26.

In the example of FIG. 2, the charge state notification 32 indicates that the traction battery 14 has a SOC that is zero. In particular, the charge state notification 32 indicates "0% SOC! Recharge required!" The user can view the charge state notification 32 and recognize that recharging the traction battery 14 is necessary. In response to the charge state notification 32, the user may move the electrified vehicle 10 to a position appropriate for recharging the traction battery 14, such as moving the electrified vehicle 10 to a charging station.

Although the charge state notification 32 indicates that the traction battery 14 has a SOC that is zero, the charge state notification 32 is communicates as soon as the actual SOC is depleted to fall within a reserve range. Thus, the charge state notification 32 is initially communicated when the traction battery 14 has an actual SOC that is greater than zero.

Providing the charge state notification 32 indicating that the traction battery 14 has a SOC that is zero when the actual SOC falls within the reserve range can help to ensure that the traction battery 14 can provide power to the electric machine 18 to move the electrified vehicle 10 to the charging station. Maintaining the reserve range helps to prevent the electrified vehicle 10 from becoming stranded.

The electrified vehicle 10 includes a controller module 34. The controller module 34 is operably linked to the display 30. The controller module 34 can control the type of charge state notifications presented on the display 30.

The controller module 34 can be a microcontroller unit (MCU). The controller module 34 could include a single controller module, or selected portions of a plurality of different controller modules.

The controller module 34 can include, among other things, a processor and a memory portion. The processor can be programmed to execute a program stored in the memory portion. The processor can be a custom made or commercially available processor, a central processing unit (CPU), an auxiliary processor among several processors associated with the controller module 34, a semiconductor based microprocessor (in the form of a microchip or chipset) or generally any device for executing software instructions.

The memory portion can include any one or combination of volatile memory elements. Programs can be stored in the memory portion as software code and used to adjust and initiate the charge state notification 32. The programs can include one or more additional or separate programs, each of which includes an ordered list of executable instructions for implementing logical functions associated with control of the charge state notification 32.

The charge state notification 32, in the exemplary embodiment, is shown as a text-based charge state notification presented on the display 30. Other variations of the charge state notification 32 could include audible charge state notifications, or charge state notifications sent somewhere other than the display 30, such as a text-based charge state notification sent to a user device.

In the exemplary embodiment, the controller module 34 may, for example, cause the charge state notification 32 to be presented to the user on the display 30 when the actual SOC of the traction battery 14 falls to, say, ten percent.

The actual SOC that will trigger the controller module 34 to communicate the charge state notification 32 is adjustable. The user, for example, can adjust the controller module 34 so that the charge state notification 32 indicating that the SOC is zero is instead displayed with the actual SOC of the traction battery 14 falls to fifteen percent rather than ten percent.

In some examples, the adjustments are made without requiring involvement from the user. For example, the controller module 34 may receive a communication C from an at least partially cloud-based server 38 that is outside the electrified vehicle 10. The communication C can be received at a wireless communication module 42 of the electrified vehicle 10. The communication C can provide an input to the controller module 34 that causes the controller module 34 to display cause the charge state notification 32 when the actual SOC of the traction battery 14 falls to fifteen percent rather than ten percent.

In some examples, the communication C is pushed to the electrified vehicle 10 without any request from the electrified vehicle 10. In other examples, the electrified vehicle 10 sends a request R to the at least partially cloud-based server 38. The request R can prompt the at least partially cloud-based server 38 to send the communication C. In some examples, the request R is sent automatically in response to, for example, a set time period expiring. The request R could be send every six months, for example. In other examples, the user initiates the communicating of the request R.

Figure 3:
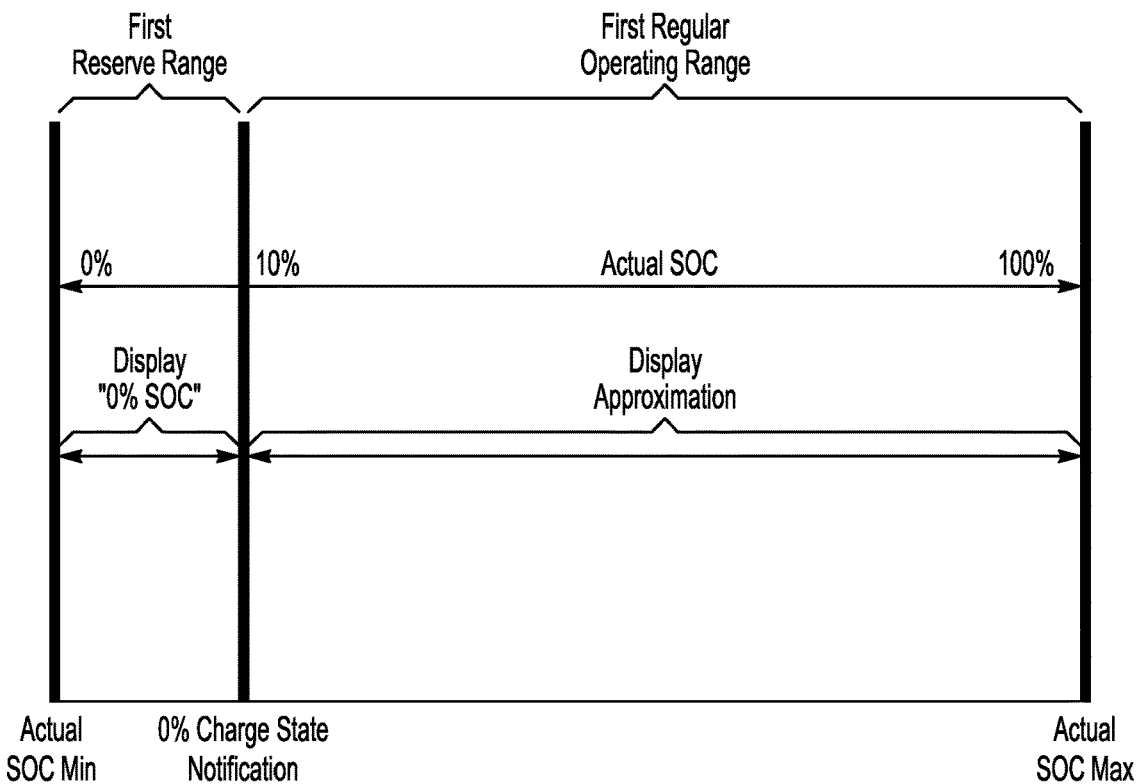
FIG. 3 shows a chart of a first reserve range, a first regular operating range, and an exemplary actual state of charge at which a charge state notification will be displayed.
Figure 4:
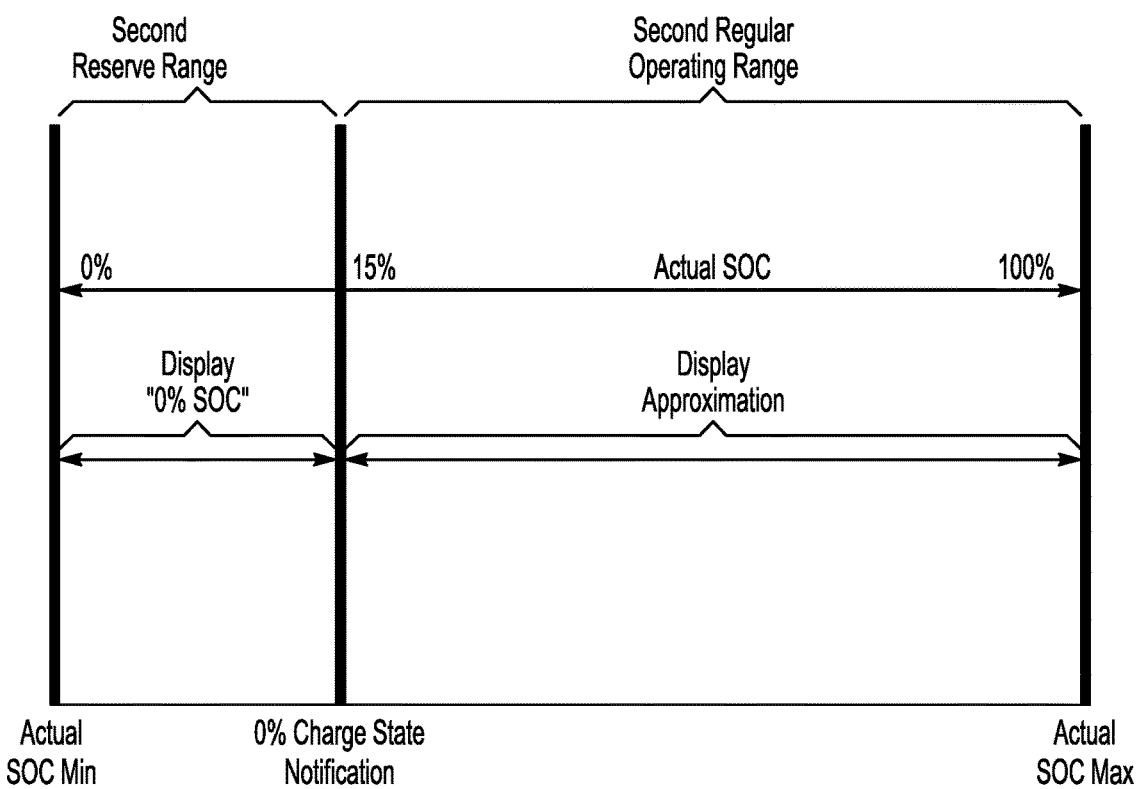
FIG. 4 shows a chart of an adjusted second reserve range, an adjusted second regular operating range, and an exemplary actual state of charge at which a charge state notification will be displayed.

FIG. 3 shows a comparison of the charge state notification 32 to an actual SOC for a traction battery prior to the adjustment described above. FIG. 4 shows a comparison of the charge state notification 32 to an actual SOC for a traction battery after the adjustment described above.

The actual SOC begins at a SOC minimum where the actual SOC is zero percent. The actual SOC extends from the SOC minimum to an SOC maximum where the actual SOC is one-hundred percent.

In FIG. 3, when the actual SOC is from zero percent to ten percent, the actual SOC of the traction battery 14 is considered to fall within a first reserve range. The actual SOC of ten percent represents an upper limit of the first reserve range. When the actual SOC of the traction battery 14 is from ten percent to one-hundred percent, the actual SOC of the traction battery 14 is considered to fall within a first regular operating range. The actual SOC of ten percent represents a lower limit of the first regular operating range.

In FIG. 4, the reserve range has been adjusted from the first reserve range shown in FIG. 3. In FIG. 4, when the actual SOC is from zero percent to fifteen percent, the actual SOC of the traction battery 14 is considered to fall within a second reserve range. The actual SOC of fifteen percent represents and upper limit of the second reserve range. In FIG. 4, when the actual SOC of the traction battery 14 is from fifteen percent to one-hundred percent, the actual SOC of the traction battery 14 is considered to fall within a second regular operating range. The actual SOC of fifteen percent represents a lower limit of the second regular operating range.

In the exemplary embodiment, the controller module 34 is configured to adjust the first reserve range from that shown in FIG. 3 to the second reserve range shown in FIG. 4. The controller module 34 further prompts the communicating of the charge state notification 32 when the actual SOC is depleted such that the actual SOC falls within the first or second reserve range.

Thus, when configured as shown in FIG. 3, the controller module 34 initiates the charge state notification 32 indicating zero percent SOC when the actual SOC is ten percent or less. After the adjusting to the configuration of FIG. 4, the controller module 34 initiates the charge state notification 32 indicating zero percent SOC when the actual SOC is fifteen percent or less.

When configured as shown in FIG. 3, when the actual SOC of the traction battery 14 is from ten percent to one-hundred percent, the charge state notification can be altered to show an approximation of the percent charge remaining within the regular operating range. Thus, when the actual SOC is 55%, the charge state notification 32 would show "50% SOC."

As the electrified vehicle 10 is operated and the actual SOC of the traction battery 14 reduced, the charge state notification will display a decreasing percentage of the SOC until the traction battery 14 is depleted and reaches an actual SOC of ten percent. At that point, the charge state notification 32 indicates "0% SOC! Recharge required!" as shown in FIG. 2. The first reserve range of ten percent is reserved within the traction battery 14 even though the charge state notification 32 indicates that the traction battery 14 has an SOC that is zero.

When configured as shown in FIG. 4, when the actual SOC of the traction battery 14 is from fifteen percent to one-hundred percent, the charge state notification can be altered to show an approximation of the percent charge remaining within the regular operating range. Thus, when the actual SOC is 52.5%, the charge state notification 32 would show "50% SOC."

As the electrified vehicle 10 is operated and the actual SOC of the traction battery 14 reduced, the charge state notification 32 will display a decreasing percentage of the SOC until the traction battery 14 is depleted and reaches an actual SOC of fifteen percent. At that point, the charge state notification 32 indicates "0% SOC! Recharge required!" The second reserve range of fifteen percent is reserved within the traction battery 14 even though the charge state notification 32 indicates that the traction battery 14 has an SOC that is zero.

Figure 5:
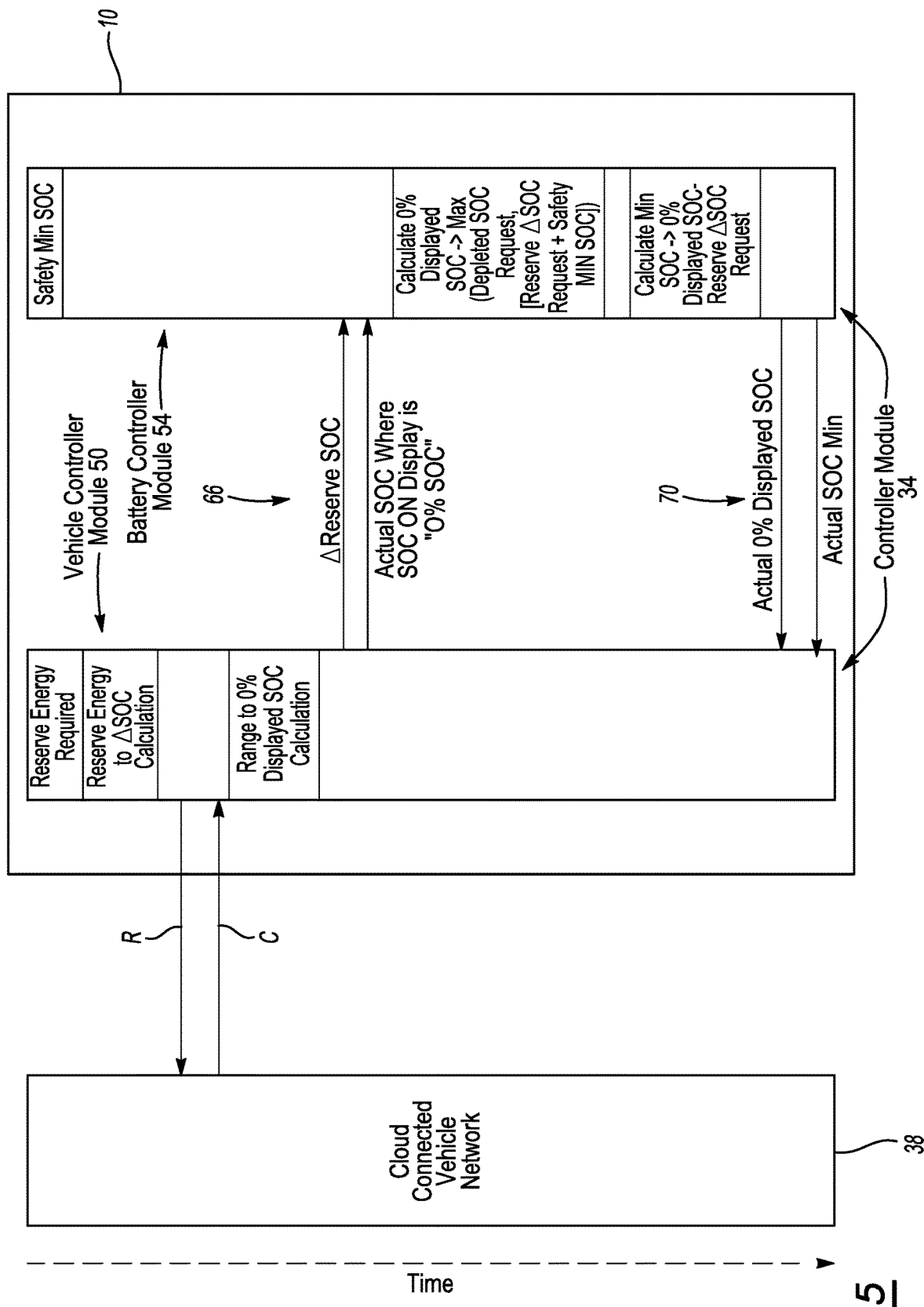
FIG. 5 illustrates a highly schematic view of communications between the exemplary electrified vehicle and an at least partially cloud based server.

With reference to FIG. 5, in an exemplary embodiment, the controller module 34 of the electrified vehicle 10 can include a vehicle controller module 50 and a battery controller module 54. The vehicle controller module 50 can incorporate the wireless communication module 42, which can transmit the request R to the at least partially cloud-based server 38, which is a cloud connected vehicle network in this example.

The request R can include a request for a desired reserve range for the electrified vehicle 10. Controller modules, such as the controller module 34, can periodically request the reserve ranges.

In response to the request R, the at least partially cloud-based server 38 transmits the communication C back to the wireless communication module 42 of the vehicle controller module. The communication C includes the desired reserve range for the electrified vehicle 10 and indicates that the charge state notification 32 (for example, "0% SOC!") should be displayed when the actual SOC falls within the desired reserve range. The desire reserve range could be 50 miles, for example. The at least partially cloud-based server 38 can store reserve ranges for various types of electrified vehicles.

Using the desired reserve range, the vehicle controller module 50 calculates the actual SOC for the traction battery 14 where the charge state notification 32 on the display 30 will be zero. A change in this information, if required, is communicated to the battery controller module 54 along path 66 as a request.

The battery controller module 54 can utilize the information communicated along the path 66 and limits for the traction battery 14 to calculate an actual SOC at which the "0% SOC!" should be displayed to the user. The actual SOC can equal a max of the state of charge required to meet the desired reserve range plus the absolute minimum charge (e.g., safety minimum SOC) for the traction battery 14. This information is communicated back to the vehicle controller module 50 along the path 70.

These values communicated along the path 70 back to the vehicle controller module 50 can be used by the vehicle controller module 50 and the remaining portions of the vehicle. The vehicle controller module 50 can, for example, initiate the charge state notification 32 when the actual SOC reaches the actual SOC at which the "0% SOC!" should be displayed. For example, as previously described, in connection with FIG. 4, when the actual SOC reaches fifteen percent, the vehicle controller module 50 causes the "0% SOC!" notification to be shown on the display 30.

Features of the disclosed examples include facilitating a dynamic reserve range for a vehicle. A charge state notification such as a charge state notification indicating a "0% SOC!" can be displayed in response to adjusted amounts of reserve charge. No additional hardware is necessarily required to vary the actual SOC at which the displayed SOC will be shown as zero.

Fleet vehicles, for example a rental fleet, may choose to increase a reserve range to mitigate the potential for stranded users of fleet vehicles. The users of the fleet vehicles would be notified of a zero percent state of charge when the reserve range is higher at an earlier time than if the reserve range were lowered. This provides the users with more opportunity to return to a charging station after viewing the charge state notification.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An electrified vehicle state of charge communication method, comprising:
   communicating a charge state notification when an actual state of charge of a traction battery is depleted such that the actual state of charge falls within a first reserve range;
   adjusting the first reserve range to provide a second reserve range different than the first reserve range; and
   after the adjusting, communicating the charge state notification when the actual state of charge is depleted such that the actual state of charge falls within the second reserve range.

2. The electrified vehicle state of charge communication method of claim 1, wherein the adjusting comprises increasing such that an upper limit of the second reserve range is greater than an upper limit of the first reserve range.

3. The electrified vehicle state of charge communication method of claim 1, wherein,
   prior to the adjusting, the charge state notification indicates that that traction battery has a state of charge that is zero when the actual state of charge falls within the first reserve range, and,
   after the adjusting, the charge state notification indicates that the traction battery has a state of charge that is zero when the actual state of charge falls within the second reserve range.

4. The electrified vehicle state of charge communication method of claim 1, wherein the actual state of charge of the traction battery is greater than zero when the charge state notification is communicated prior to the adjusting, and the actual state of charge of the traction battery is greater than zero when the charge state notification is communicated after the adjusting.

5. The electrified vehicle state of charge communication method of claim 1, wherein the charge state notification comprises displaying that that traction battery has a state of charge that is zero.

6. The electrified vehicle state of charge communication method of claim 1, wherein,
   prior to the adjusting, the charge state notification indicates that the traction battery has a state of charge that is zero when the actual state of charge of the traction battery is depleted to a first amount that is greater than zero, and
   after the adjusting, the charge state notification indicates that the traction battery has a state of charge that is zero when the actual state of charge of the traction battery is depleted to a second amount that is greater than zero, the second amount different than the first amount.

7. The electrified vehicle state of charge communication method of claim 1, further comprising adjusting in response to a communication received from outside the electrified vehicle.

8. The electrified vehicle state of charge communication method of claim 7, further comprising sending a request for the communication, the request sent from the electrified vehicle.

9. An electrified vehicle state of charge communication method, comprising:
   communicating a charge state notification when an actual state of charge of a traction battery is depleted such that the actual state of charge falls within a first reserve range;
   adjusting the first reserve range to provide a second reserve range different than the first reserve range; and
   after the adjusting, communicating the charge state notification when the actual state of charge is depleted such that the actual state of charge falls within the second reserve range,
   wherein, prior to the adjusting, a regular operating range for the traction battery has a lower limit corresponding to an upper limit of the first reserve range, the actual state of charge of the traction battery within the regular operating range when the actual state of charge of the traction battery has not been depleted to fall within the first reserve range.

10. The electrified vehicle state of charge communication method of claim 9, wherein the adjusting includes decreasing a lower limit of the regular operating range and an upper limit of the first reserve range.

11. The electrified vehicle state of charge communication method of claim 9, wherein the adjusting includes increasing a lower limit of the regular operating range and an upper limit of the first reserve range.

12. An electrified vehicle state of charge communication assembly, comprising:
   a traction battery;
   a notification system that communicates a charge state notification to a user in response to an actual state of charge of the traction battery being depleted to fall within a reserve range; and
   a controller that adjusts the reserve range to change the actual state of charge that will cause the notification system to communicate the charge state notification, wherein the actual state of charge of the traction battery is greater than zero when the charge state notification indicates that the traction battery has a state of charge that is zero.

13. The electrified vehicle state of charge communication method of claim 1, wherein the actual state of charge of the traction battery is greater than zero when the charge state notification indicates that the traction battery has a state of charge that is zero.

14. The electrified vehicle state of charge communication assembly of claim 12, wherein the charge state notification indicates that the traction battery has a state of charge that is zero.

15. The electrified vehicle state of charge communication assembly of claim 12, wherein the controller adjusts the reserve range by increasing or decreasing the reserve range.

16. The electrified vehicle state of charge communication assembly of claim 12, wherein increasing the reserve range raises a lower limit of a regular operating range, and decreasing the reserve range lowers the lower limit of the regular operating range.

17. The electrified vehicle state of charge communication assembly of claim 12, wherein the controller adjusts the reserve range in response to an adjustment communication received from outside the electrified vehicle.

18. The electrified vehicle state of charge communication assembly of claim 17, wherein the adjustment communication is received from an at least partially cloud-based server.

19. The electrified vehicle state of charge communication assembly of claim 18, further comprising a transmitter of the electrified vehicle that sends a requesting communication from the electrified vehicle to the at least partially cloud-based server, the requesting communication from the electrified vehicle prompting the at least partially cloud-based server to transmit the adjustment communication to the electrified vehicle.

* * * * *